(12) United States Patent
Lang

(10) Patent No.: US 6,241,222 B1
(45) Date of Patent: Jun. 5, 2001

(54) STACKED PACKING WITH SPACING FEATURES

(75) Inventor: Ko C. Lang, Agoura Hills, CA (US)

(73) Assignee: Lantec Products, Inc., Agoura Hills, CA (US)

( * ) Notice: Subject to any disclaimer, the term of this patent is extended or adjusted under 35 U.S.C. 154(b) by 0 days.

(21) Appl. No.: 09/353,248

(22) Filed: Jul. 14, 1999

Related U.S. Application Data

(60) Provisional application No. 60/092,779, filed on Jul. 14, 1998.

(51) Int. Cl.$^7$ ....................................... B01F 3/04
(52) U.S. Cl. ................. 261/94; 96/290; 261/DIG. 72
(58) Field of Search ............................... 261/94–98, 108, 261/DIG. 72; 210/150, 151; 96/290; 95/211

(56) References Cited

U.S. PATENT DOCUMENTS

| | | | |
|---|---|---|---|
| 1,947,777 | * | 2/1934 | Huff et al. ............................... 261/94 |
| 3,466,149 | * | 9/1969 | Blood et al. ......................... 261/94 X |
| 3,645,510 | * | 2/1972 | Klugman ................................. 261/94 |
| 4,275,019 | * | 6/1981 | Bednarski ............................... 261/98 |
| 4,290,980 | * | 9/1981 | Pikon et al. ............................ 261/94 |
| 4,382,046 | * | 5/1983 | Frohwerk ...................... 261/DIG. 72 |
| 4,472,358 | * | 9/1984 | Khudenko ......................... 210/150 X |
| 4,481,155 | * | 11/1984 | Frohwerk ...................... 261/DIG. 72 |
| 4,724,593 | * | 2/1988 | Lang ................................. 261/94 X |
| 5,458,817 | * | 10/1995 | Lang ...................................... 261/94 |
| 5,498,376 | * | 3/1996 | St. Louis et al. ............. 261/DIG. 72 |
| 5,851,636 | * | 12/1998 | Lang et al. .................... 261/DIG. 72 |

FOREIGN PATENT DOCUMENTS

808110 * 3/1981 (SU) ............................. 261/DIG. 72

* cited by examiner

*Primary Examiner*—Richard L. Chiesa
(74) *Attorney, Agent, or Firm*—Marvin E. Jacobs

(57) ABSTRACT

Highly efficient packing bodies are formed by stacking plates having at least 30% open space provided by apertures and rod-like baffle elements which project from a surface of the plate. The panels are latched together into a stack by means of a plurality of latching rods, longer than the baffle rods which are frictionally received into opposed sockets formed in the surface of the adjacent plate. A cover plate with downwardly depending rods and latching sockets disposed to receive the latching rods from the opposed plate is utilized to prevent the exposed rods from engaging the rods of other plates so that voids in a packed tower are avoided.

12 Claims, 2 Drawing Sheets

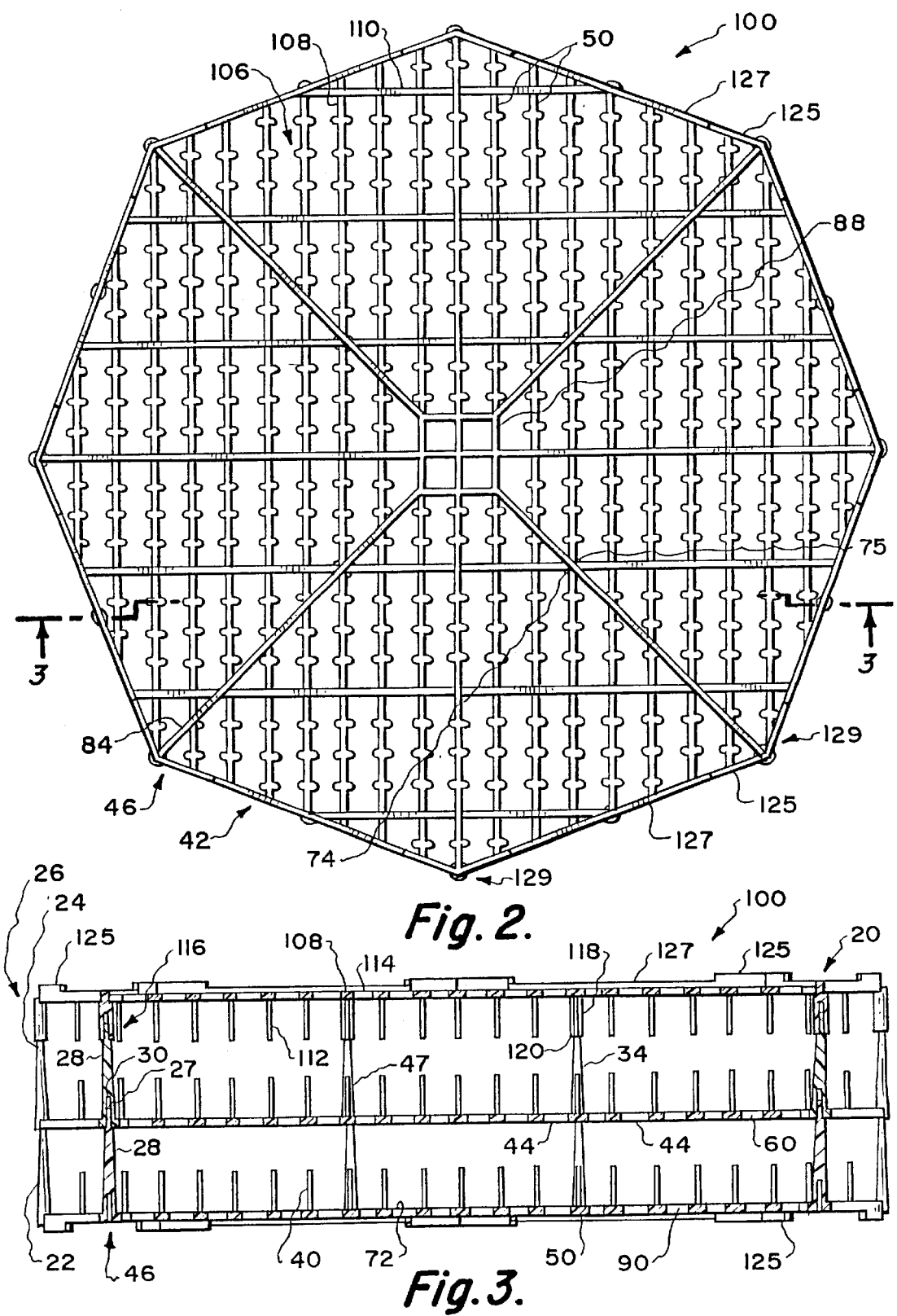

STACKED PACKING WITH SPACING FEATURES

CROSS-REFERENCE TO PROVISIONAL APPLICATION

This application is based on provisional application Ser. No. 60/092,779 filed Jul. 14, 1998.

TECHNICAL FIELD

The present invention relates to fluid contact structures for use in packed towers.

BACKGROUND OF THE INVENTION

Packed towers are used for mass transfer operations such as absorption, desorption, extraction, scrubbing and the like. The function of the packing is to facilitate mass transfer between two fluid streams, usually moving countercurrent to each other. Efficiency and rate of mass transfer are enhanced by providing large surface area in the packing to facilitate contact of the fluids and by breaking the liquid into very fine droplets to enhance mass transfer to a gas phase.

U.S. Pat. No. 4,724,593 describes an improved method for manufacturing high performance, symmetrical, open volumed packing bodies. The high performance packing bodies have performed well and have captured a significant share of the market. An open, non-obstructive structure provides low pressure drop while dispersing and distributing flow in both longitudinal and lateral directions.

While the void volume of the interior structure of the packing body is less than prior high efficiency packing bodies, the structure normal to the longitudinal axis is still difficult to provide and manufacture requires several bending and rolling operations to form the sheet material into a packing body.

An improved packing body is disclosed in U.S. Pat. No. 5,498,376 issued Mar. 12, 1996, the disclosure of which is expressly incorporated herein by reference. A perforated strip of material is simply rolled into a spiral or into a concentric cylinder structure. The improved packing bodies have a high degree of open space, from 30% to 98%. Surprisingly, the rolled packing bodies are found to provide better mass transfer and efficiency than prior packing body structures.

Packing bodies having substantially open structure with good baffling action formed by folding and bending adjacent perforated panels along fold lines to form packing bodies in which the plates are substantially parallel to each other are disclosed in U.S. Pat. No. 5,458,817 issued Oct. 17, 1995.

Packing bodies are produced with complex shapes in a simplified manner from separate, perforated plates which are stacked in parallel relation. They are fixed in that relation by spacing means such as projections from the surfaces of the segments or side members such as bent or separate perforated side plates adhered to the side edges of the stacked segments. The plates also include baffle means for increasing disruption of the fluid into droplets.

The projections from the surface of the segments can also be used as baffles to disrupt large droplets, to create local turbulence, to increase contact between gas and liquid and to facilitate mass transfer. The projections can be polygonal tabs raised from the surface. The baffle tabs can be diamond, rectangular or circular in shape. Thin cylindrical rod projections from the surface have been found to be very effective in facilitating mass transfer while providing an open volume of above 30% with very low pressure drop.

Highly efficient packing bodies have recently been developed which utilize some longer rod projections to space and/or latch adjacent plates together. All of the baffle elements are rod-like projections and are substantially parallel to each other. All of the rod-like elements are releasable from a mold. The panels can be manufactured from a single mold and latched together to form a stacked packing body. The preferred latching means are sockets provided in the bottom surface of the adjacent panel. The latching rods can be tapered and are frictionally engaged in an opposed socket. Adhesive can be used to assure that the panels do not separate.

The panels can be successively reduced in size to form packing bodies having complex, polygonal shapes approaching spherical by simply molding a plurality of panels of different shapes and sizes. The panels can be square, rectangular, circular or oval. A differently shaped body can also be provided by cutting a square body across several panels to form a facet shaped member.

These packing bodies have a high degree of open space provided by perforations, at least about 30% of the packing body is open space, preferably from 50% to 98% of the body is open space. The rods provide increased surface for fluid contact.

The plates can be formed of metal, thermosetting resins, thermoplastic resins or ceramic precursors such as metal oxides dispersed in organic binder resin. The perforated plates are formed by molding organic resin materials. After the plate is in its final configuration, the plate can be fired to cure the resin or convert the precursor to a final ceramic state.

These packing bodies can be produced from much simpler starting materials. Even if molds are used to form the plates, the molds are much cheaper and simpler than molds used to form prior high performance packing bodies. Packing bodies can be formed in complex shapes that can not be practically made by other techniques and can be produced at much lower costs.

The stacked packing bodies 10 as shown in FIG. 1 (Prior Art) tend to entangle due to open rods 12 projecting from the bottom plate 14 which can enter the openings in the top plate and become entangled with rods in the sides or bottom of an adjacent stacked packing body.

STATEMENT OF THE INVENTION

An improved, stacked packing body is provided in accordance with this invention which reduces the binding of one stacked packing body to another. A first feature of the improved packing body is the inversion of the last plate to enclose and cap the ends of the rods. A further feature is to add spacing elements to the outside faces of the packing, preferably partial spacers provided on the perimeter of the outside plates and other spacers radially directed from the circumference toward the center of the packing.

The plates can have a thickness from 0.1 to 15 mm. In the case of metal, the thickness is usually from 0.2 to 0.4 mm. In the case of plastic, the thickness is usually from 0.5 to 3 mm, preferably 1 to 2 mm and in the case of ceramic, the strip preferably has a thickness from 2 to 8 mm.

The packing bodies of the invention are suited for waste water treatment, particularly in bio-film reactors. The high surface area of wavy brush-like packing now in use becomes covered with a layer of bacteria. The tank is periodically cleaned by air shearing to peel-off and dispose of the bacteria. Preliminary tests have been conducted with square stacked packing of the invention. The performance of the stacked packing of the invention was roughly the same in most cases and better in some cases (depending on the type of contaminants in the water). However, the stacked packing of the invention is less expensive and considerably easier to install than the brush packing, especially in large reactors. So on a cost/performance basis the stacked packing is clearly superior.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 2 is a top view of a further embodiment of a stacked packing; and

FIG. 3 is a view in section taken along line 3—3 of FIG. 2.

DETAILED DESCRIPTION OF THE INVENTION

Figure 1:
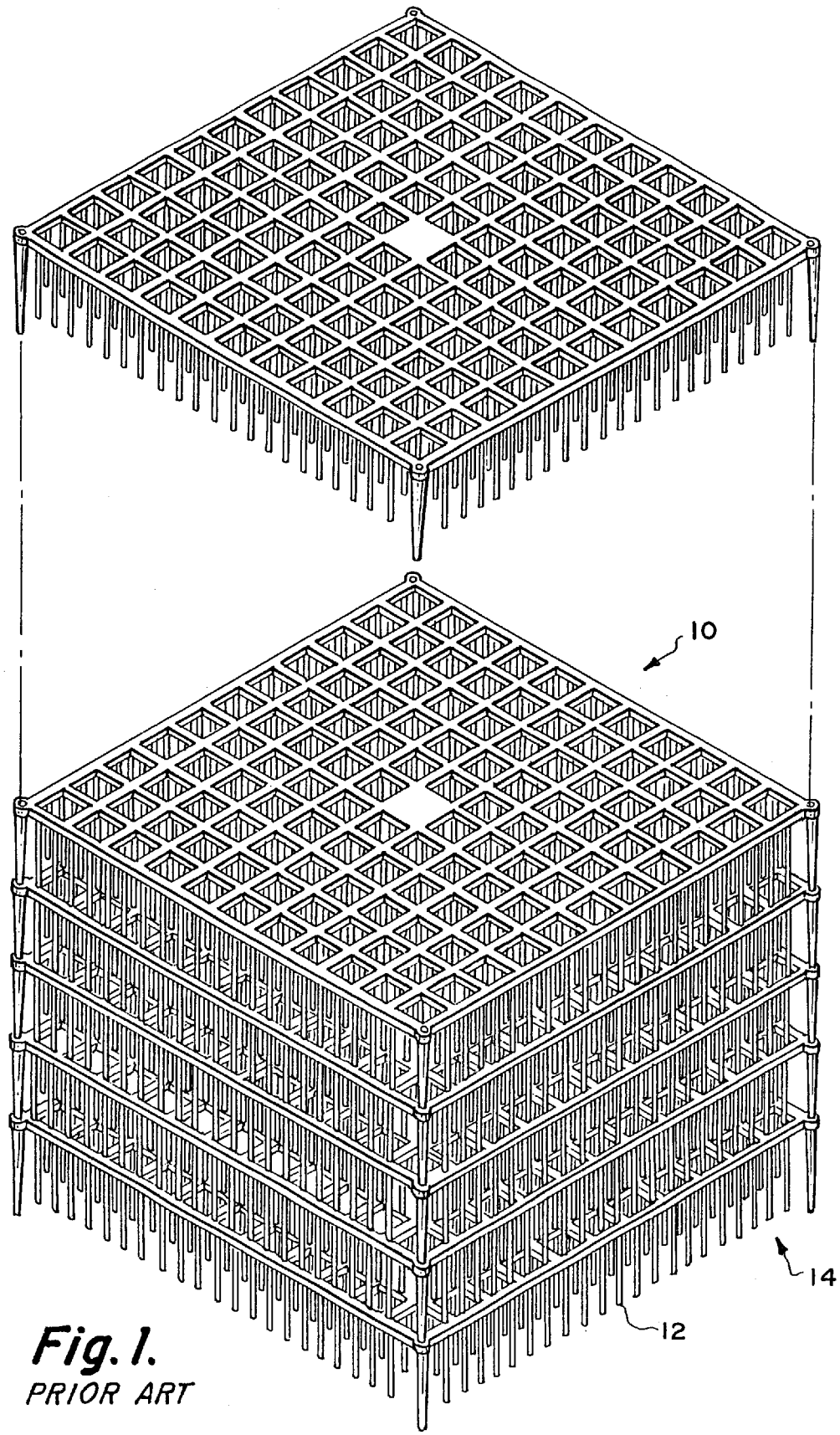
FIG. 1 is a perspective view with one plate detached of a prior art stacked packing containing a plurality of rod-like projections.

Referring now to FIGS. 2 and 3, an improved stacked packing body 20 is formed of at least two individual plates 22, 24. The plates are joined into a stack 26 by inserting the tapered end 27 of longer rods 28 from the first plate 22 into an opposed socket 30 on the adjacent plate 24. The end portions 31 of the longer rods 28 are preferably tapered to facilitate entering the socket 30. The plate is preferably formed of a flexible, plastic inert to the liquid and gas media in a tower such as polypropylene or various flexible injection moldable fluoropolymers such as Teflon PFA (perfluoroalkyl vinyl ether-tetrafluoroethylene copolymer) and Teflon FEP (tetrafluoroethylene-hexafluoropropylene copolymer). The plastic is flexible and slightly deformable. It can form a secure joint 34 when forced into a socket 30. The reliability of the joint 34 can be enhanced by the use of adhesive. Liquid adhesive can be injected into the socket before forming the joint. The polygonal plates illustrated in FIG. 2 have a diameter of about 9.5 inches. The length of each segment is about 4 inches. Baffle rods 40 are about ½ inch long.

Each plate 22 can have a border 42 formed of equally sized perimeter segment members 44. The longer rods 28 are placed at least at the corner intersections 46 of the perimeter segment members 44. The sockets 30 can be formed in top portion 47 of each of the longer rods 28.

The plates 22, 24 also contain a grid of cross members 50 and 60. The cross members 50, 60 can be parallel to the side members 44 in case of a rectangular packing or can be at an angle to the side members in case of a polygon such as an octagon. Additional latching rods 28 with sockets 30 can be molded onto interior intersections of the cross members 50, 60 and at places in between the intersections. Usually, random packing will have at least two latching joints, generally from 4 to 12 joints, usually from 6–8 joints for packings with 4–6 plates. A stacked packing will have at least 10 to 50 latching points.

A plurality of baffle rods 28 depend from the lower surface 72 of the cross members 50, 60. The baffle rods 28 are thin and may be tapered. Generally, the rods are from 1/32 inch to ¼ inch, typically about ⅛ inch at the base. The baffle rods 28 are usually mounted at each intersection 74 of the cross members and usually also at the mid point 75 between adjacent intersections.

The plates 22, 24 could be cut or stamped into shaped plates such as round, oval or polygonal and stacked. However, this would weaken the stacked packing body since a portion of the border would be cut away as would some or all of the long rods and sockets which provide latching joints. As shown in FIG. 2, it is preferred to separately mold each plate with a perimeter border 42 and with longer hollow rods 28 with socket 30 and with joints 34 mounted on or adjacent the perimeter border 42. The perimeter border 42 for the polygon top plates 22, 24 can be continuous. The longer rods 28 can be formed opposite an aperture 30 in a longer rod 28 or opposite a cavity formed in a member facing the rod 28.

Referring now to FIGS. 2 and 3, one aspect of the invention is the provision of a terminal cover plate 100 for the last plate 24 of the stack 26. The cover plate 100 can have the same or different shape than the stack. The cover plate 100 is preferably no larger than the stacked plates to avoid binding to other packing bodies and forming voids in the packed tower.

The cover plate 100 also contains an open grid 106 formed of grid members 108, which extends across the plate and reinforcing cross members 110 which intersect the members 108. Rod-like baffle elements 112 project downwardly from the edge 114 of the members 108, 110. Small spacer elements 125, parallel to the baffle elements 112 may be attached to the top face 127 of the plate 100, preferably, at the intersections 129 of the sides 127. The spacer elements 125 need not cover the side 127. The spacer elements 125 need only occupy from 10 to 50% the length of a side 127. The spacer elements 125 extend vertically from the sides a distance of about 0.05 inch to 0.500 inch, generally about 0.1 inch.

Socket members 116 also project downwardly from the cover plate 100 in the form of a short rod 118 containing a cavity 120. The position of the socket members 116 correlates to the position of the longer latching rods 28 on the adjacent plate 24. When the rods 28 are inserted into the sockets 116 on the cover plate 100, the cover plate 100 is latched to the adjacent plate 24 by compression fit and/or adhesive bonding. The spacing between the baffling elements 112 and the opposed plate 24 is less than the height of the stack.

Another feature of the invention is the provision of spacer structure on the outside faces of the stack to further prevent undesired stacking of the packing bodies. The spacers can be continuous or discontinuous. Partial spacers 125 can be mounted on the outside face of the perimeter of the terminal plates as previously discussed. Radial spacers 84 can be provided which run from the perimeter segments 127 toward the center of the top plate 100. The radial ribs are shown connected to a raised square spacer 88 which is one aspect of the mold and is not necessary to the spacing function. The partial spacers 125 mounted on the perimeter can also be connected to the outside surface 90 of the first plate 22 and are identified with the same part numbers.

The stacked packing body can have a width and a height from 1 to 20 inches, generally from 3 to 10 inches. Usually, the width to height ratio is about ⅛ to ¼. The spacing and latching rods are generally longer by at least ⅛ to ¾ of an inch, generally about ⅜ inch longer. The number of plates is determined by the length of the rod baffles and the spacing between plates. The spacing of the plates is related to packing factor. The plates can have a thickness from 0.1 to 15 mm. In the case of metal, the thickness is usually from 0.2 to 0.4 mm. In the case of plastic, the thickness is usually from 0.5 to 3 mm, preferably 1 to 2 mm and in the case of ceramic, the strip preferably has a thickness from 2 to 8 mm. A packing body will generally have a packing factor from about 3 to 65 per foot and a surface area from about 10 to 200 ft²/cu.ft. The rods have a diameter from 1/16 to ¼ inch, generally about ⅜ inch longer. The rods need not be cylindrical. They can have a square or other polygonal cross-section. The packing body has a polygonal shape such as cylindrical, rectangular, hexagonal or octagonal. Generally, the diameter of each stackable packing body is from 3 inches to 15 inches, generally about 10 inches. The height of a 3 layer stacked packing body can be from 1 inch to 10 inches, generally around 3 inches.

The spacing between plates depends on the height of the baffle rods. Generally, the rods have a height from 1/16 to 2.0 inches and have a tapered end. The rods may project upwardly, downwardly or some may project upwardly and some may project downwardly. The packing body will have at least 2 plates preferably from 2 to 30 plates. Random packing bodies are generally from 1 to 5 inches in nominal diameter, have a height from 1 to 4 inches and baffle rods from 1/16 to ¾ of an inch. The method of the invention could also be used to produce large, modular, structured packing bodies such as cubic or rectangular-shaped modules such as 1 foot×1 foot×1 foot; 2 foot×1 foot×1 foot or 3 foot×1 foot×1 foot. The structured modules are placed one module at a time into a tower until the tower is filled.

The packing body can be in the form of a polygon such as a rectangle, hexagon or octagon having parallel side walls. The panels can step down in width in discrete steps.

The modular plates can be interconnected into stacks by inserting a longer rod into the opposed socket in the next plate. The plates can be stacked alternating the orientation of the rods from facing axially with the tower to transverse to the axis of the tower. The outside volume of the tower between the stacks of packing and the wall of the tower can be filled with random packing.

The plates need not be the same size. When the plates differ in size, they can be stacked to form three dimensional polygon shapes approaching ovoid or spherical shape.

It is to be realized that only preferred embodiments of the invention have been described and that numerous substitutions, modifications and alterations are permissible without departing from the spirit and scope of the invention as defined in the following claims.

What is claimed is:

1. A packing body for use in fluid contact comprising in combination:

a plurality of individual panels containing a pattern of apertures; p1 fluid baffle means raised from top and/or bottom surfaces of the panels comprising a plurality of rod elements projecting from said surfaces;

means spacing a plurality of the panels into a stack having a top panel and a bottom panel;

means latching the panels together comprising a plurality of latching rods longer than said rod elements projecting from one of said surfaces and sockets for receiving ends of said rods formed in the opposed surface of an adjacent panel; and at least one cover panel, having an outward facing surface and an inward facing surface, said cover panel containing a pattern of apertures, fluid baffle means comprising a plurality of rod elements projecting only from said inward facing surface, and a plurality of sockets for receiving ends of latching rods projection from said top and or bottom panel of the stack.

2. A packing body according to claim 1 in which the ends of said latching rods are tapered and said ends are frictionally received in said sockets.

3. A packing body according to claim 1 in which the open volume is above 30%.

4. A packing body according to claim 3 in which the open volume is from 50 to 98%.

5. A packing body according to claim 1 formed from synthetic organic resin.

6. A packing body according to claim 1 in which the panels are rectangular and the panels form a rectangular stack.

7. A packing body according to claim 6 in which at least one corner of the rectangular stack is removed to form a facet plane on said packing body.

8. A packing body according to claim 1 containing 2 to 30 panels.

9. A packing body according to claim 8 in which the body has a packing factor from 3–65 per foot.

10. A packing body according to claim 9 in which the body has a surface area from 70–200 ft²/cuft.

11. A packing body according to claim 1 in which the cover panel is absent rod and baffle projections on the outer facing surface.

12. A packing body according to claim 1 in which a cover panel is attached to both the top and bottom panels of the stack.

* * * * *